United States Patent
Yamahara et al.

(10) Patent No.: US 12,169,000 B2
(45) Date of Patent: Dec. 17, 2024

(54) MECHANICAL COMPONENT AND METHOD FOR MANUFACTURING MECHANICAL COMPONENT

(71) Applicant: NTN CORPORATION, Osaka (JP)

(72) Inventors: Ayaka Yamahara, Kuwana (JP); Miyu Sato, Kuwana (JP); Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/955,741

(22) PCT Filed: Dec. 14, 2018

(86) PCT No.: PCT/JP2018/046152
§ 371 (c)(1),
(2) Date: Jun. 18, 2020

(87) PCT Pub. No.: WO2019/124265
PCT Pub. Date: Jun. 27, 2019

(65) Prior Publication Data
US 2020/0318684 A1    Oct. 8, 2020

(30) Foreign Application Priority Data
Dec. 20, 2017 (JP) ................................ 2017-244284
Dec. 20, 2017 (JP) ................................ 2017-244285

(51) Int. Cl.
C21D 9/40    (2006.01)
F16C 33/12   (2006.01)
C22C 14/00   (2006.01)

(52) U.S. Cl.
CPC .............. *F16C 33/121* (2013.01); *C21D 9/40* (2013.01); *C22C 14/00* (2013.01); *F16C 2204/42* (2013.01)

(58) Field of Classification Search
CPC .... F16C 33/121; F16C 2204/42; F16C 33/14; F16C 17/02; F16C 17/04; F16C 17/10;
(Continued)

(56) References Cited

U.S. PATENT DOCUMENTS

2002/0011267 A1* 1/2002 Hirose ..................... C23C 8/80
                                                        137/375
2013/0316188 A1* 11/2013 Mori .................. B23K 26/0006
                                                        219/121.69

FOREIGN PATENT DOCUMENTS

JP    S61-002747 B2    1/1986
JP    S612747    *    1/1986    ........... A61B 5/0836
(Continued)

OTHER PUBLICATIONS

"Removal of heat-formed coating from a titanium alloy using high pressure waterjet: Influence of machining parameters on surface texture and residual stress", Huang et al., Journal of Materials Processing Technology 223, 2015, pp. 129-138 (Huang). (Year: 2015 ).*

(Continued)

*Primary Examiner* — Kevin C T Li
(74) *Attorney, Agent, or Firm* — Rimon P.C.

(57) ABSTRACT

A mechanical component according to one aspect of the present invention is made of a titanium alloy and has a surface. The mechanical component includes a plurality of primary α crystal grains and a plurality of secondary α crystal grains. At the surface of the mechanical component the primary α crystal grains have an area ratio of 10% or more and 30% or less. At the surface of the mechanical component the secondary α crystal grains have a major diameter of 75 μm or less and a minor diameter of 10 μm or less. At the surface of the mechanical component 1% by mass or more of oxygen is included.

22 Claims, 11 Drawing Sheets

(58) Field of Classification Search
CPC ... C21D 9/40; C22C 14/00; C22F 1/18; C22F 1/00; C23C 8/12
See application file for complete search history.

(56) References Cited

FOREIGN PATENT DOCUMENTS

| JP | H02-066142 A | | 3/1990 |
|---|---|---|---|
| JP | H07-268598 A | | 10/1995 |
| JP | H11-029847 A | | 2/1999 |
| JP | 2002-097914 A | | 4/2002 |
| JP | 2007100666 A | * | 4/2007 |

OTHER PUBLICATIONS

International Search Report issued in corresponding International Patent Application No. PCT/JP2018/046152, dated Mar. 5, 2019, with English translation.

F. Borgioli et al., Improvement of wear resistance of Ti—6Al—4V alloy by means of thermal oxidation, Material Letters, 59 (2005), pp. 2159-2162.

H.Fujii et al., "Application of Titanium and Its Alloys for Automobile Parts," Nippon Steel Technical Report, No. 378, 2003, pp. 62-67, with partial English translation.

K. Mori et al., "Effect of Oxygen Hardened Surface Layer on the Fatigue Properties of Ti—5Al—2Fe—3Mo with Fine Acicular Microstructure," Materials and Processes (CAMP-ISIJ), Iron and Steel Institute of Japan, vol. 22, No. 2, 2009, p. 1459, with partial English translation.

Japanese Office Acton issued in corresponding Japanese Patent Application No. JP2017-244284, dated Jul. 13, 2021 with English translation.

Japanese Office Acton issued in correspondingJapanese Patent Application No. JP2017-244285, dated Jul. 13, 2021, with English translation.

* cited by examiner

MECHANICAL COMPONENT AND METHOD FOR MANUFACTURING MECHANICAL COMPONENT

CROSS REFERENCE TO RELATED APPLICATIONS

This patent application is the U.S. National Phase under 35 U.S.C. § 371 of International Application No. PCT/JP2018/046152, filed on Dec. 14, 2018, which claims the benefit of Japanese Patent Application No. 2017-244284, dated Dec. 20, 2017, and Japanese Patent Application No. 2017-244285, dated Dec. 20, 2017, the entire contents of each are hereby incorporated by reference in their entirety.

TECHNICAL FIELD

The present invention relates to a mechanical component and a method for manufacturing the mechanical component. More specifically, the present invention relates to a mechanical component made of a titanium alloy and a method for manufacturing the mechanical component made of the titanium alloy.

BACKGROUND ART

Conventionally, mechanical components made of titanium alloy have been widely known. Mechanical components made of titanium alloy are used for example for aircraft, automobile components, and the like. Mechanical components made of titanium alloy are required to have wear resistance. Accordingly, it is a common practice to subject mechanical components made of titanium alloy to a heat treatment for increasing hardness.

A heat treatment for increasing the hardness of a mechanical component made of a titanium alloy includes a solution treatment. In the solution treatment, a heating step is initially performed. In the heating step, the mechanical component is heated to a temperature higher than the β transformation starting temperature of the titanium alloy forming the mechanical component. Thus a portion of an α phase in the titanium alloy forming the mechanical component undergoes α phase transformation to a β phase.

Secondly, in the solution treatment, a cooling step is performed. In the cooling step, the β phase generated in the heating step undergoes a phase transformation to a secondary α phase. This improves the mechanical component made of the titanium alloy in hardness.

Simply performing the solution treatment may not allow the mechanical component made of the titanium alloy to have a surface with sufficient hardness. Accordingly, to allow the mechanical component made of the titanium alloy to have a surface further enhanced in hardness, as described in Non-Patent Literature 1 (F. Borgioli et. al., "Improvement of wear resistance of Ti-6Al-4V alloy by means of thermal oxidation, Material Letters, 59 (2005), (pp. 2159-2162)), a surface treatment may further be performed to form a solid solution of oxygen in the surface of the mechanical component made of the titanium alloy.

CITATION LIST

Non Patent Literature

NPL 1: F. Borgioli et. al., "Improvement of wear resistance of Ti-6Al-4V alloy by means of thermal oxidation, Material Letters, 59 (2005), pp. 2159-2162.

SUMMARY OF INVENTION

Technical Problem

However, the surface treatment performed to form a solid solution of oxygen, nitrogen or the like in the surface of the mechanical component made of the titanium alloy causes coarsening of crystal grains in the surface and the vicinity thereof. As a result, while the mechanical component made of the titanium alloy can have a surface enhanced in hardness, the coarsened crystal grains result in reduced fatigue strength.

The present invention has been made in view of the above-described problem of the conventional art. More specifically, the present invention provides a mechanical component having a surface with hardness and fatigue strength coestablished therein.

Solution to Problem

A mechanical component according to one embodiment of the present invention is made of a titanium alloy and has a surface. The mechanical component includes a plurality of primary α crystal grains and a plurality of secondary α crystal grains. At the surface of the mechanical component the primary α crystal grains have an area ratio of 10% or more and 30% or less. At the surface of the mechanical component the secondary α crystal grains have a major diameter of 75 μm or less and a minor diameter of 10 μm or less. At the surface of the mechanical component 1% by mass or more of oxygen is included.

In the above mechanical component, the surface may have an oxygen concentration of 1.3% by mass or more. In the above mechanical component, the surface may have an oxygen concentration of 1.6% by mass or more.

In the above mechanical component, the surface may have a hardness of 600 Hv or more. In the above mechanical component, the surface may have a hardness of 650 Hv or more. In the above mechanical component, the surface may have a hardness of 700 Hv or more.

In the above mechanical component, the titanium alloy may be an α-type titanium alloy or an α+β-type titanium alloy. In the above mechanical component, the titanium alloy may be a 64 titanium alloy.

The above mechanical component may be a bearing component. The above mechanical component may be a plain bearing.

A method for manufacturing a mechanical component according to one embodiment of the present invention comprises: a step of preparing a member to be processed, the member being made of a titanium alloy and having a surface; a solution treatment step of holding the member at a first holding temperature and subsequently cooling the member; an aging treatment step performed after the solution treatment step and holding the member at a second holding temperature and subsequently cooling the member; and an oxygen permeation step performed after the aging treatment step and holding the member in an atmosphere of an oxygen-containing gas at a third holding temperature to introduce oxygen into the surface. The first holding temperature is equal to or higher than the β transformation starting temperature of the titanium alloy and lower than the β single phase transformation temperature of the titanium alloy. The third holding temperature is lower than the first holding temperature.

In the above method for manufacturing a mechanical component, the first holding temperature may be not lower than a temperature lower by 60° C. than the β single phase transformation temperature of the titanium alloy, and lower than the β single phase transformation temperature of the titanium alloy.

In the above method for manufacturing a mechanical component, the member may be held in the solution treatment step for a period of time of 60 seconds or more and 2400 seconds or less.

In the above method for manufacturing a mechanical component, the second holding temperature may be 400° C. or higher and 700° C. or lower. In the above method for manufacturing a mechanical component, the second holding temperature may be 500° C. or higher and 560° C. or lower.

In the above method for manufacturing a mechanical component, the member may be held in the aging treatment step for a period of time of 30 seconds or more and $4.3 \times 10^4$ seconds or less. In the above method for manufacturing a mechanical component, the member may be held in the aging treatment step for a period of time of $7.2 \times 10^3$ seconds or more and $3.6 \times 10^4$ seconds or less.

In the above method for manufacturing a mechanical component, the third holding temperature may be 800° C. or higher and 920° C. or lower. In the above method for manufacturing a mechanical component, the third holding temperature may be 850° C. or higher.

In the above method for manufacturing a mechanical component, the member may be held in the oxygen permeation step for a period of time of $1.4 \times 10^4$ seconds or more to $9.0 \times 10^4$ seconds or less.

In the above method for manufacturing a mechanical component, the gas of the atmosphere may have normal atmospheric pressure. The gas of the atmosphere may further include an inert gas. The gas of the atmosphere may have an oxygen partial pressure of 50 ppm or more and 500 ppm or less.

In the above method for manufacturing a mechanical component, the inert gas may be at least one selected from the group consisting of argon, helium, and nitrogen.

In the above method for manufacturing a mechanical component, the titanium alloy may be an α-type titanium alloy or an α+β-type titanium alloy. In the above method for manufacturing a mechanical component, the titanium alloy may be a 64 titanium alloy.

Advantageous Effects of Invention

The mechanical component according to one embodiment of the present invention has a surface with primary α crystal grains in the surface with an area ratio of 10% or more and 30% or less of the surface, and thus has the surface mainly composed of secondary α crystal grains relatively higher in hardness. Furthermore, the mechanical component according to one embodiment of the present invention has the surface with an oxygen concentration of 1% by weight or more in the surface and thus reinforced by oxygen through solid solution. The mechanical component according to one embodiment of the present invention thus has a surface improved in hardness. Further, at the surface of the mechanical component according to one embodiment of the present invention the secondary α crystal grains have a major diameter of 75 μm or less and a minor diameter of 10 μm or less. Accordingly the mechanical component according to one embodiment of the present invention has a surface with crystal grains therein prevented from coarsening, and as a result has the surface enhanced in fatigue strength. Thus the mechanical component according to one embodiment of the present invention can have a surface with hardness and fatigue strength coestablished in the surface.

According to a method for manufacturing a mechanical component according to one embodiment of the present invention, at a surface of the mechanical component, primary α crystal grains have a relatively low area ratio. Further, according to the method for manufacturing a mechanical component according to one embodiment of the present invention, at the surface of the mechanical component, secondary α crystal grains have major and minor diameters relatively reduced (or are made fine). Thus the method for manufacturing a mechanical component according to one embodiment of the present invention can provide a mechanical component having a surface with hardness and fatigue strength coestablished in the surface.

DESCRIPTION OF EMBODIMENTS

An embodiment will specifically be described with reference to the drawings. In the figures, identical or equivalent components will identically be denoted and will not be described redundantly.

(Mechanical Component According to Embodiment)

Hereinafter, a configuration of a mechanical components according to an embodiment will be described.

Figure 1:
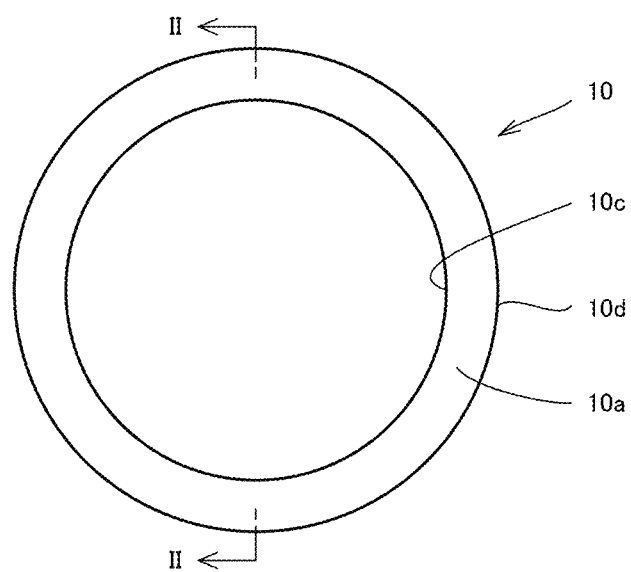
FIG. 1 is a top view of a mechanical component according to an embodiment.
Figure 2:
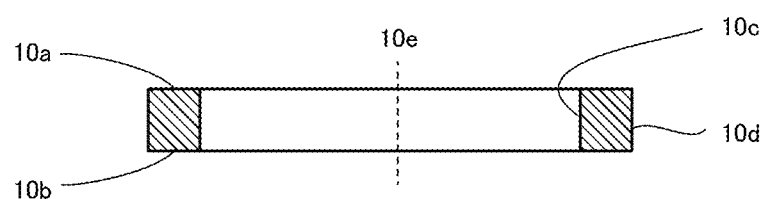
FIG. 2 is a cross section taken along a line II-II in FIG. 1.

FIG. 1 is a top view of a mechanical component according to the embodiment. FIG. 2 is a cross section taken along a line II-II in FIG. 1. As shown in FIGS. 1 and 2, the mechanical component according to the embodiment is, for example, a bearing component. More specifically, the mechanical component according to the embodiment is a plain bearing 10. Although the mechanical component according to the embodiment is not limited thereto, plain bearing 10 will be described below as an example of the mechanical component according to the embodiment.

Plain bearing 10 is made of a titanium alloy. More specifically, the titanium alloy used for plain bearing 10 is a Ti-6Al-4V alloy (hereinafter, referred to as a "64 titanium alloy") specified in ASTM standards. Table 1 shows an alloy composition of the 64 titanium alloy.

The 64 titanium alloy includes 5.50% by mass or more to 6.75% by mass or less of aluminum (Al), 3.50% by mass or more to 4.50% by mass or less of vanadium (V), 0.40% by mass or less of iron (Fe), 0.08% by mass or less of carbon (C), 0.050% by mass or less of nitrogen (N), 0.015% by mass or less of hydrogen, 0.20% by mass of oxygen (O), and a balance of titanium (Ti).

TABLE 1

| Al (mass %) | V (mass %) | Fe (mass %) | C (mass %) | N (mass %) | H (mass %) | O (mass %) | Ti |
|---|---|---|---|---|---|---|---|
| 5.50 or more and 6.75 or less | 3.50 or more and 4.50 or less | 0.40 or less | 0.08 or less | 0.05 or less | 0.015 or less | 0.20 or less | balance |

However, the titanium alloy used for plain bearing 10 is not limited thereto. The titanium alloy used for plain bearing 10 may be an α-type titanium alloy or an α+β-type titanium alloy. Examples of the α-type titanium alloy include a Ti-5Al-2.5Sn alloy, a Ti-8Al-1Mo-1V alloy, a Ti-6Al-2Sn-4Zr-2Mo alloy and the like specified in ASTM standards. Examples of the α+β alloy include a Ti-3Al-2.5V alloy, a Ti-6Al-2Sn-4Zr-6Mo alloy, a Ti-6Al-6V-2Sn (Cu+Fe) alloy and the like specified in ATMS standards.

Note that the α-type titanium alloy is a titanium alloy presenting a structure of a single phase of an α phase at ordinary temperature, and the α+β-type titanium alloy is a titanium alloy presenting a two-phase structure composed of an α phase and a β phase at ordinary temperature. Note that the α phase is a low-temperature phase of titanium having a hcp (hexagonal close packed) structure, and the β phase is a high-temperature phase of titanium having an fcc (face centered cubic) structure.

Plain bearing 10 is in the form of a ring. Plain bearing 10 has a surface. That is, plain bearing 10 has a top surface 10a, a bottom surface 10b, an inner circumferential surface 10c, and an outer circumferential surface 10d. Top surface 10a and bottom surface 10b define end faces of plain bearing 10 in a direction along a central axis 10e. Inner circumferential surface 10c and outer circumferential surface 10d are contiguous to top surface 10a and bottom surface 10b. The distance between inner circumferential surface 10c and central axis 10e is smaller than the distance between outer circumferential surface 10d and central axis 10e.

Plain bearing 10 includes a plurality of primary α crystal grains and a plurality of secondary α crystal grains in the surface. The primary α crystal grain is a crystal grain composed of a primary α phase. The secondary α crystal grain is a crystal grain composed of a secondary α phase.

The primary α phase is an α phase that remains without being transformed into a β phase in any of a solution treatment step S2, an aging treatment step S3, and an oxygen permeation step S4 described below. The secondary α phase is a phase formed by martensitic transformation or massive transformation when cooled after once transformed into the β phase. The secondary α phase includes an α' phase having the hcp structure and an α'' phase having the orthorhombic structure.

The primary α crystal grains and the secondary α crystal grains can be distinguished by their minor diameters. That is, the primary α crystal grains have a minor diameter larger than 10 μm, and the secondary α crystal grains have a minor diameter of 10 μm or less.

At the surface of plain bearing 10 the primary α crystal grains have an area ratio of 10% or more and 30% or less. The area ratio of the primary α crystal grains is measured by the following method. That is, in measuring the area ratio of the primary α crystal grains, initially, an image of a structure in cross section in the surface of plain bearing 10 or a vicinity of the surface is obtained through EBSD (Electron Back Scatter Diffraction) (hereinafter, this image of the structure in cross section will be referred to as an EBSD image). The EBSD image is obtained so as to include a sufficient number of (i.e., 20 or more) primary α crystal grains. Secondly, a total area of the primary α crystal grains in the EBSD image is measured, and divided by a total area of the EBSD image. The value thus obtained is defined as an area ratio of primary α crystal grains on the surface of plain bearing 10.

At the surface of plain bearing 10 the secondary α crystal grains have a major diameter of 75 μm or less and a minor diameter of 10 μm or less. The minor and major diameters of the secondary α crystal grains in the surface of plain bearing 10 are measured in the following method. That is, in measuring the major and minor diameters of the secondary α crystal grains in the surface of plain bearing 10, initially, an EBSD image is obtained in and near the surface of plain bearing 10. The EBSD image is obtained so as to include a sufficient number of (i.e., 20 or more) secondary α crystal grains. Secondly, each secondary α crystal grain in the EBSD image has its major and minor diameters measured. The maximum value of the major diameters of the secondary α crystal grains in the BESD is defined as the major diameter of all secondary α crystal grains in the surface of plain bearing 10, and the maximum value of the minor diameters of the secondary α crystal grains in the BESD is defined as the minor diameter of all secondary α crystal grains in the surface of plain bearing 10.

The surface of plain bearing 10 has an oxygen concentration of 1.0% by mass or more. The surface of plain bearing 10 may have an oxygen concentration of 1.3% by mass or more. The surface of plain bearing 10 may have an oxygen concentration of 1.6% by mass or more. The surface of plain bearing 10 may have an oxygen concentration of 2% by mass or more. The surface of plain bearing 10 may have an oxygen concentration of 2.5% by mass or more. The surface of plain bearing 10 may have an oxygen concentration of 3% by mass or more. Note that the oxygen concentration in the surface of plain bearing 10 is equal to or below the solid solubility of oxygen in the titanium alloy forming plain bearing 10. The oxygen concentration in the surface of plain bearing 10 is measured for example with an EPMA (Electron Probe Micro Analyzer).

The surface of plain bearing 10 has a hardness of 600 Hv or more. The surface of plain bearing 10 preferably has a hardness of 650 Hv or more. The surface of plain bearing 10 preferably has a hardness of 700 Hv or more. The surface of plain bearing 10 may have a hardness of 900 Hv or more. The hardness at the surface of plain bearing 10 is measured according to a Vickers test method specified in JIS standards (JIS Z2244: 2009).

(Method for Manufacturing a Mechanical Component According to Embodiment)

Hereinafter, a method for manufacturing a mechanical component according to an embodiment will be described.

Figure 3:
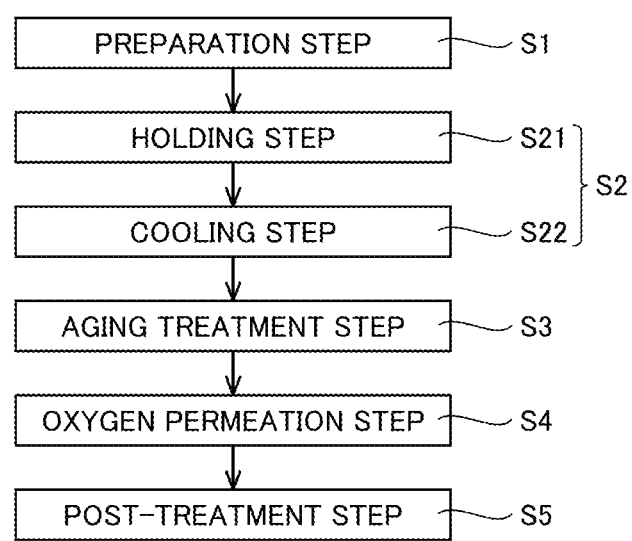
FIG. 3 is a flowchart of a method for manufacturing the mechanical component according to the embodiment.

FIG. 3 is a flowchart of a process indicating the method for manufacturing a mechanical component according to the embodiment. As shown in FIG. 3, the method for manufacturing a mechanical component according to the embodiment includes a preparation step S1, a solution treatment step S2, an aging treatment step S3, an oxygen permeation step S4, and a post-treatment step S5.

In the preparation step S1, a member to be processed is prepared. The member to be processed is a ring-shaped member to be plain bearing 10 through the solution treatment step S2, the aging treatment step S3, the oxygen permeation step S4, and the post-treatment step S5. The member to be processed is made of a titanium alloy. The member to be processed is made of an α-type titanium alloy or an α+β titanium alloy, for example. More specifically, the member to be processed is made of a 64 titanium alloy.

In the solution treatment step S2, the member to be processed has a constituent thereof, or a titanium alloy, subjected to a solution treatment. The solution treatment step S2 has a holding step S21 and a cooling step S22. In the holding step S21, the member to be processed is held in a furnace at a prescribed holding temperature (hereinafter referred to as a "first holding temperature") for a prescribed period of time (hereinafter referred to as a "first holding time"). In the solution treatment step S2, an α phase in the titanium alloy forming the member to be processed is partially transformed into β phase.

The first holding temperature is higher than the β transformation starting temperature of the titanium alloy forming the member to be processed. The first holding temperature is lower than the β single phase transformation temperature of the titanium alloy forming the member to be processed. The β transformation starting temperature is a temperature at which at least a portion of the α phase in the titanium alloy forming the member to be processed starts to transform into the β phase. The β single phase transformation temperature is a temperature at which the α phase in the titanium alloy forming the member to be processed all transforms into the β phase. The first holding temperature is preferably not lower than a temperature lower by 60° C. than the β single phase transformation temperature, and lower than the β single phase transformation temperature. The first holding time is preferably 60 seconds or more and 2400 seconds or less.

An inert gas is used as a gas of the atmosphere in the furnace in the holding step S21. As the inert gas, for example, a rare gas such as argon (Ar) or helium (He), or gaseous nitrogen is used. The gas of the atmosphere in the furnace in the holding step S21 for example has normal atmospheric pressure.

The cooling step S22 is performed after the holding step S21. In the cooling step S22, the member to be processed is cooled after it has undergone the holding step S21. Thus, the α phase that has once transformed into the β phase in the holding step S21 becomes a secondary α phase. The cooling step S22 is performed for example by using a solution of salt having a concentration of 5% by mass to cool the member to be processed.

The aging treatment step S3 is performed after the solution treatment step S2. In the aging treatment step S3, the member to be processed is held in the furnace at a prescribed temperature (hereinafter referred to as a "second holding temperature") for a prescribed period of time (hereinafter referred to as a "second holding time"), and thereafter cooled. The aging treatment step S3 decomposes a portion of the secondary α phase in the titanium alloy forming the member to be processed. The second holding temperature is lower than the β transformation starting temperature of the titanium alloy forming the member to be processed. The second holding temperature is preferably 400° C. or higher and 700° C. or lower. The second holding temperature is more preferably 500° C. or higher and 560° C. or lower. The second holding time is preferably 30 seconds or more and $4.3 \times 10^4$ seconds or less, more preferably $7.2 \times 10^3$ seconds or more and $3.6 \times 10^4$ seconds or less.

The oxygen permeation step S4 is performed after the aging treatment step S3. The oxygen permeation step S4 introduces oxygen at the surface of the member to be processed into the member to be processed. In the oxygen permeation step S4, titanium oxide ($TiO_2$, $TiO$) is formed on the surface of the object to be processed. Note that the titanium oxide formed on the surface of the object to be processed is removed in the post treatment step S5. The oxygen permeation step S4 is performed by holding the object to be processed in the furnace at a prescribed holding temperature (hereinafter referred to as a "third holding temperature") for a prescribed period of time (hereinafter referred to as a "third holding time").

The third holding temperature is lower than the first holding temperature. The third holding temperature is preferably 800° C. or higher, and more preferably 850° C. or higher, from the viewpoint of increasing an oxygen diffusion rate in the titanium alloy forming the member to be processed. The third holding temperature is preferably 920° C. or lower from the viewpoint of suppressing the coarsening of crystal grains included in the titanium alloy forming the member to be processed. The third holding time is preferably $1.4 \times 10^4$ seconds or more and $9.0 \times 10^4$ seconds or less from the viewpoint of sufficiently diffusing oxygen into the member to be processed.

Oxygen and an inert gas are included in the gas of the atmosphere in the furnace in the oxygen permeation step S4. The rare gas is, for example, argon. The gas of the atmosphere preferably has an oxygen partial pressure of 50 ppm or more from the viewpoint of sufficiently diffusing oxygen into the member to be processed. The gas of the atmosphere preferably has an oxygen partial pressure of 500 ppm or less from the viewpoint of suppressing excessive formation of titanium oxide at the surface of the member to be processed.

The post-treatment step S5 is performed after the oxygen permeation step S4. In the post treatment step S5, the member to be processed undergoes a post treatment. In the post treatment step S5, for example, the member to be processed is cleaned, ground, polished, and/or similarly machined. Plain bearing 10 is thus manufactured.

(Effects of the Mechanical Component According to the Embodiment and the Method for Manufacturing the Mechanical Component According to the Embodiment)

Hereinafter, effects of the mechanical component and the method for manufacturing the mechanical component according to the embodiment will be described.

The mechanical component according to the embodiment has a surface with primary α crystal grains in the surface with an area ratio of 10% or more and 30% or less of the surface. Thus the mechanical component according to the embodiment has the surface mainly composed of secondary α crystal grains relatively high in hardness, and is thus less likely to suffer from breakage starting from primary α crystal grains relatively low in hardness. Furthermore, the mechanical component according to the embodiment has the surface with an oxygen concentration of 1% by weight or more in the surface and thus has the surface reinforced by oxygen through solid solution. The mechanical component according to the embodiment thus has a surface improved in hardness.

Further, at the surface of the mechanical component according to the embodiment the secondary α crystal grains have a major diameter of 75 μm or less and a minor diameter of 10 μm or less. The mechanical component according to the embodiment thus has a surface with crystal grains therein prevented from coarsening, and as a result has the surface enhanced in fatigue strength. Thus the mechanical component according to the embodiment and the method for manufacturing the mechanical component according to the embodiment can have and provide, respectively, a surface with hardness and fatigue strength coestablished.

Hereinafter will be described a result of each test conducted to confirm an effect of the mechanical component according to the embodiment and the method for manufacturing the same according to the embodiment.

<Samples>

Table 2 shows conditions for preparing samples subjected to the tests. As shown in Table 2, in preparing Sample 1, the first holding temperature, the second holding temperature, the third holding temperature, the first holding time, the second holding time, and the third holding time were set to 980° C., 530° C., 850° C., 20 minutes, 5 hours, and 16 hours, respectively. In preparing Sample 2, the first holding temperature, the second holding temperature, the third holding temperature, the first holding time, the second holding time, and the third holding time were set to 980° C., 530° C., and 920° C., 20 minutes, 5 hours and 12 hours, respectively. In preparing Sample 1, the oxygen permeation step S4 was performed in an atmosphere of a gas with an oxygen partial pressure set to 50 ppm. In preparing Sample 2, the oxygen permeation step S4 was performed in an atmosphere of a gas with an oxygen partial pressure set to 100 ppm. Note that Samples 1 and 2 were both made using a 64 titanium alloy.

TABLE 2

|  | sample 1 | sample 2 |
| --- | --- | --- |
| 1st holding temperature (° C.) | 980 | 980 |
| 2nd holding temperature (° C.) | 530 | 530 |
| 3rd holding temperature (° C.) | 850 | 920 |
| 1st holding time (min) | 20 | 20 |
| 2nd holding time (h) | 5 | 5 |
| 3rd holding time (h) | 16 | 12 |
| oxygen partial pressure (ppm) | 50 | 100 |

<Result of Observation of Structure>

Figure 4:
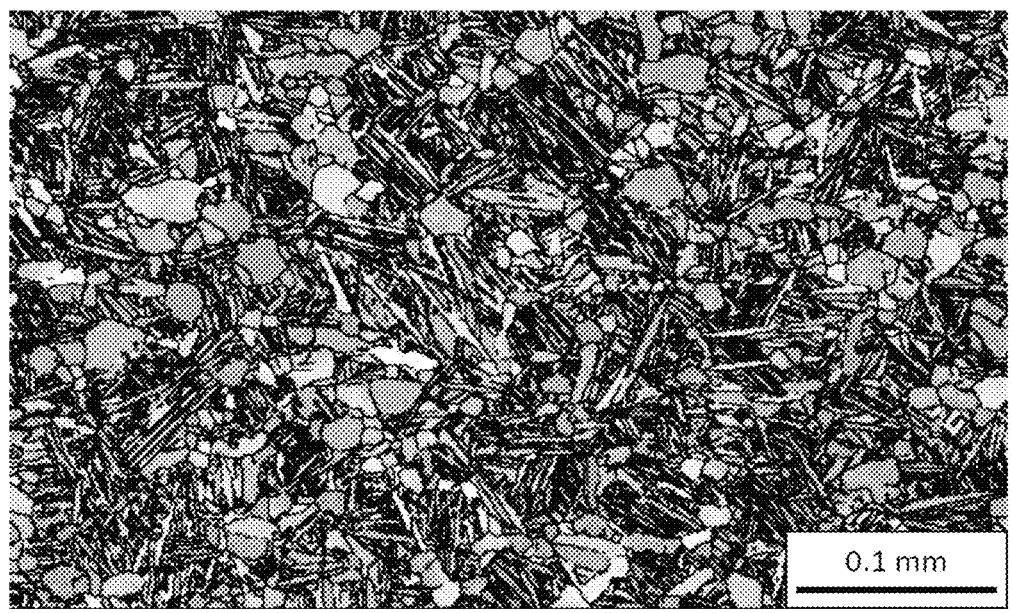
FIG. 4 is an EBSD image in and near a surface of Sample 1.
Figure 5:
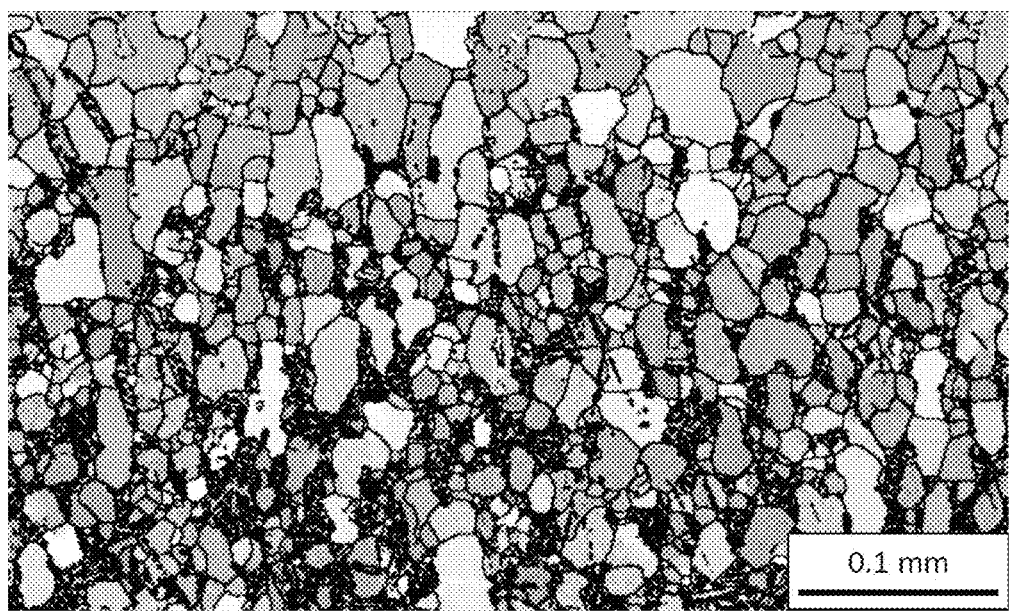
FIG. 5 is an EBSD image in and near a surface of Sample 2.

FIG. 4 is an EBSD image in and near the surface of sample 1. FIG. 5 is an EBSD image in and near the surface of sample 2. In FIG. 4, a crystal grain having a relatively small aspect ratio is a primary α crystal grain, and a crystal grain having a relatively large aspect ratio (i.e., precipitated acicularly) is a secondary α crystal grain. In FIG. 5, a crystal grain having a relatively large crystal grain size is a primary α crystal grain, and a crystal grain having a relatively small crystal grain size is a secondary α crystal grain. As shown in FIG. 4, at the surface of Sample 1, primary α crystal grains had an area ratio of about 22%. Furthermore, at the surface of Sample 1, secondary α crystal grains had a major diameter of about 50 μm and a minor diameter of about 6 μm. In contrast, as shown in FIG. 5, at the surface of Sample 2, primary α crystal grains had an area ratio of about 75%. Furthermore, at the surface of Sample 2, secondary α crystal grains had a fine grain size, and it was difficult to measure their major and minor diameters.

Figure 6:
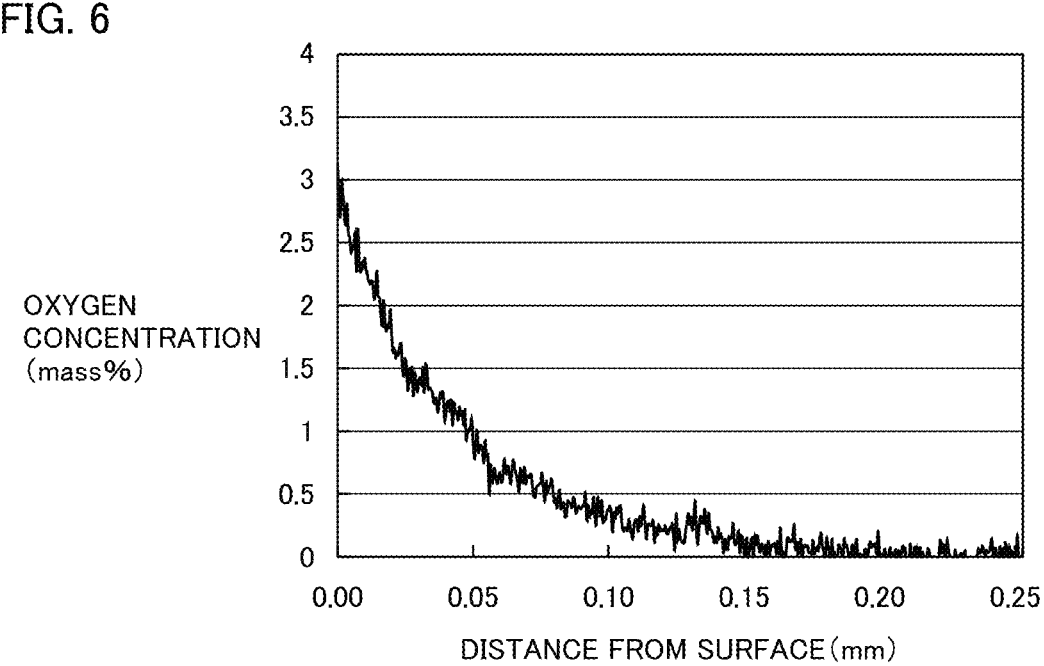
FIG. 6 is a graph showing a result of an elementary analysis in and near the surface of Sample 1.
Figure 7:
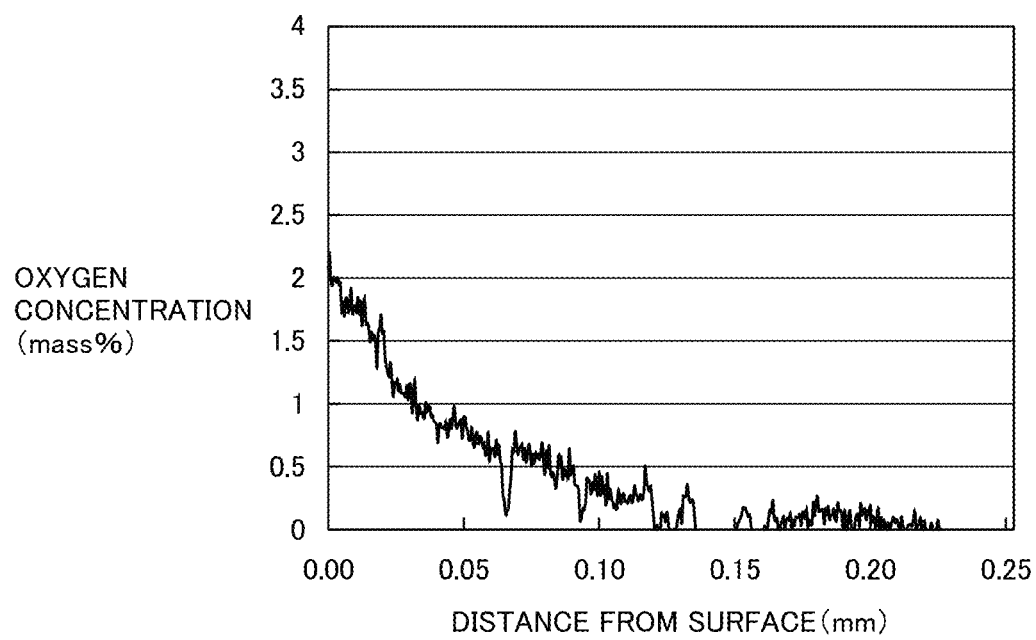
FIG. 7 is a graph showing a result of an elementary analysis in and near the surface of Sample 2.

FIG. 6 is a graph showing a result of an elementary analysis in and near the surface of Sample 1. FIG. 7 is a graph showing a result of an elementary analysis in and near the surface of Sample 2. In each of FIGS. 6 and 7, the horizontal axis represents a distance from the surface of the sample (unit: mm), and the vertical axis represents oxygen concentration (unit: % by mass). As shown in FIGS. 6 and 7, Samples 1 and 2 both had an oxygen concentration therein decreasing as the distance from the surface increased, and the samples had a substantially fixed oxygen concentration when the distance from the surface reached 0.15 mm.

As shown in FIG. 6, Sample 1 had an oxygen concentration of about 3.1% by mass in the surface. In contrast, as shown in FIG. 7, Sample 2 had an oxygen concentration of about 2.1% by mass in the surface.

<Hardness Test>

Figure 8:
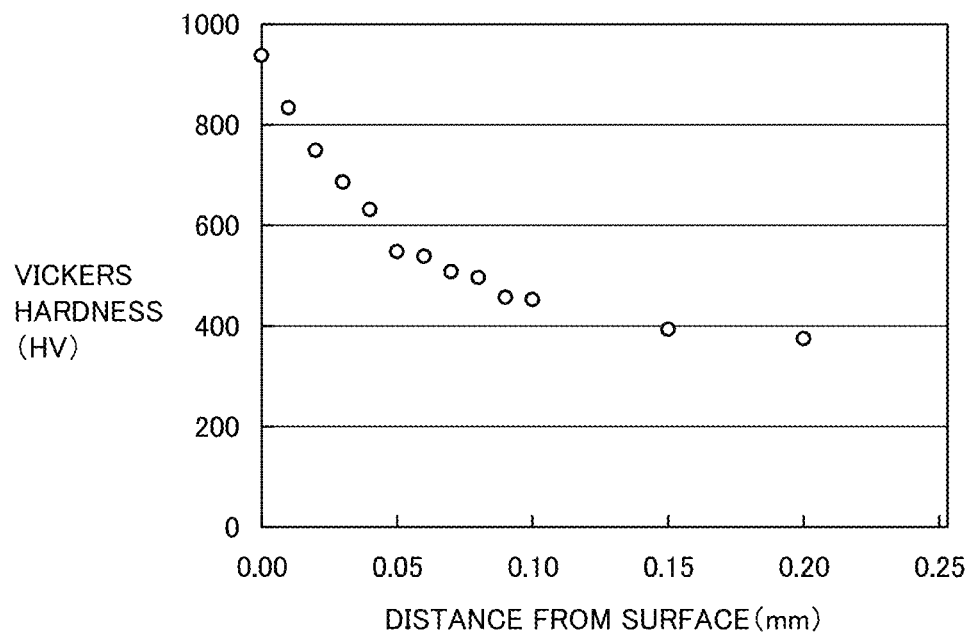
FIG. 8 is a graph showing a result of a Vickers hardness test in and near the surface of Sample 1.
Figure 9:
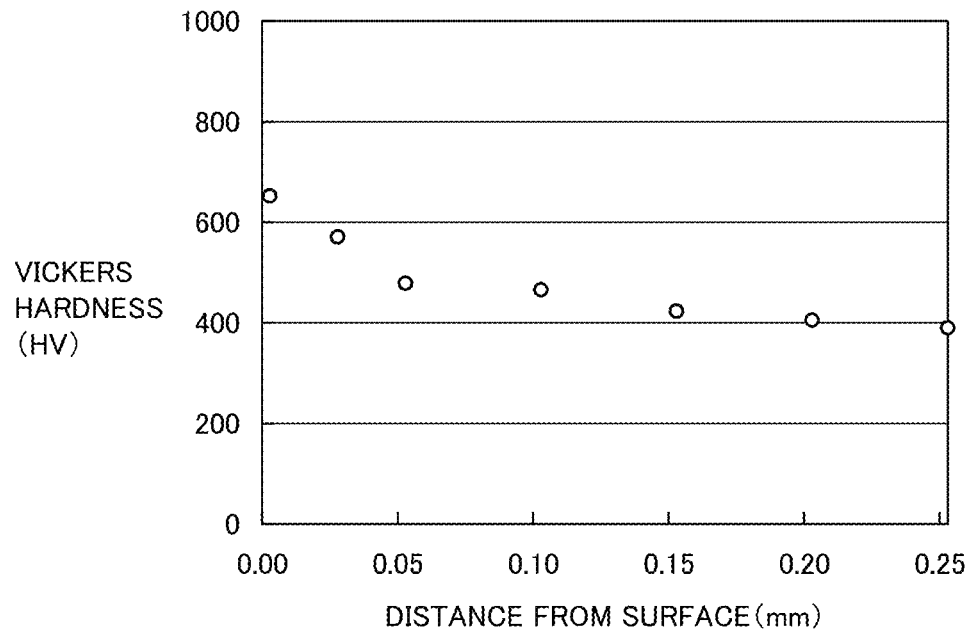
FIG. 9 is a graph showing a result of a Vickers hardness test in and near the surface of Sample 2.

FIG. 8 is a graph showing a result of a Vickers hardness test in and near the surface of Sample 1. FIG. 9 is a graph showing a result of a Vickers hardness test in and near the surface of Sample 2. In each of FIGS. 8 and 9, the horizontal axis represents a distance from the surface of the sample (unit: mm), and the vertical axis represents hardness (unit: Vickers hardness Hv). As shown in FIGS. 8 and 9, Samples 1 and 2 both had hardness decreasing as the distance from the surface increased, and the samples had substantially fixed hardness when the distance from the surface reached 0.15 mm.

As shown in FIG. 8, Sample 1 had a hardness of about 940 Hv in the surface. In contrast, as shown in FIG. 9, Sample 2 had a hardness of about 650 Hv in the surface.

Figure 10:
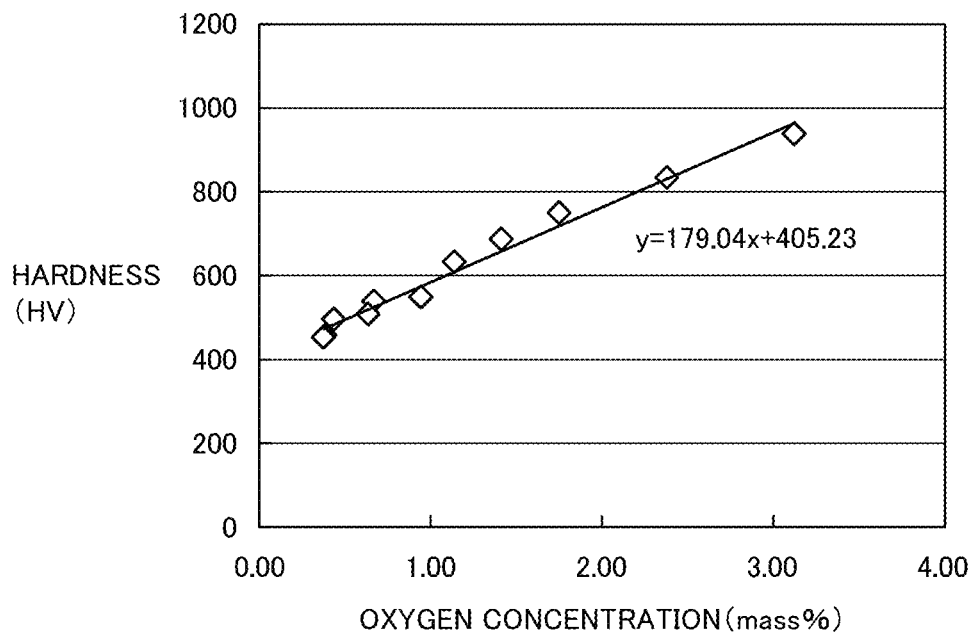
FIG. 10 is a graph showing a relationship between oxygen concentration and hardness in Sample 1.

FIG. 10 is a graph showing a relationship between oxygen concentration and hardness in Sample 1. In FIG. 10, the horizontal axis represents oxygen concentration (unit: % by mass), and the vertical axis represents hardness (unit: Vickers hardness Hv). As shown in FIG. 10, when sample 1 has an oxygen concentration X and a hardness of Y, a relationship of $Y=179.04 \times X+405.23$ is experimentally derived. Therefore, from this relational expression, it can be seen that values in hardness of 600 Hv, 650 Hv and 700 Hv are obtained by setting an oxygen concentration in the surface of the mechanical component to 1% by mass, 1.3% by mass, and 1.6% by mass, respectively.

From the above structural observation result, elementary analysis result and hardness test result, it has been experimentally confirmed that a mechanical component has a surface improved in hardness when the surface has primary α crystal grains having an area ratio of 10% or more and 30% or less of the surface, secondary α crystal grains having a major diameter of 75 μm or less and a minor diameter of 10 μm or less, and an oxygen concentration of 1% by mass or more.

<Wear Test>

Samples 3, 4, 5, and 6 shown in Table 3 were subjected to a wear test. The wear test was conducted using a Savin type wear tester. Table 4 shows conditions for the wear test. Sample 3 was prepared in the method for manufacturing a mechanical component according to the embodiment. Sample 3 was produced to have a surface having hardness of 600 Hv. Sample 3 was produced using a 64 titanium alloy. Sample 4 was produced using an unhardened material of a 64 titanium alloy. Sample 5 was produced using SUJ2 as specified in JIS standards. Sample 6 was produced using SUS440C as specified in JIS standard. Sample 5 had a surface having a hardness of 700 Hv. Sample 6 had a surface having a hardness of 650 Hv. Note that Samples 5 and 6 were quenched and tempered under typical conditions.

TABLE 3

|  | material (processing method) | hardness at surface (Hv) |
|---|---|---|
| sample 3 | 64 titanium alloy (solution treatment step/aging treatment step/oxygen permeation step) | 600 |
| sample 4 | 64 titanium alloy (unhardened material) | 330 |
| sample 5 | SUJ2 (quenched/tempered) | 700 |
| sample 6 | SUS440C (quenched/tempered) | 650 |

TABLE 4

| specific load (MPa) | 500 |
|---|---|
| sliding velocity (m/s) | 0.05 |
| test time (min) | 60 |
| lubricant | VG2 |
| oil film parameter | 0.03 |
| material of rotor | SUJ2 (quenched/tempered) |

Figure 11:
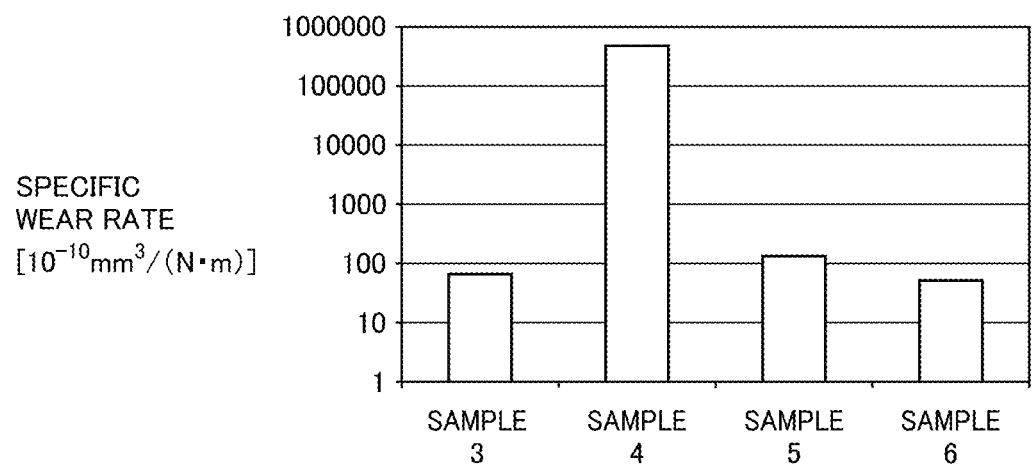
FIG. 11 is a graph showing a wear test result.

FIG. 11 is a graph showing a wear test result. In FIG. 11, the vertical axis represents a specific wear rate (unit: $10^{-10}$ mm$^3$/N·m). As shown in FIG. 11, Sample 3 presented a significantly smaller wear rate than Sample 4. Sample 3 had a specific wear rate of the same extent as Samples 5 and 6. From the above wear test result, it has also experimentally been confirmed that the mechanical component according to the embodiment has a surface enhanced in wear resistance.

While an embodiment of the present invention has been described as above, the embodiment can also be variously modified. Further, the scope of the present invention is not limited to the above embodiment. The scope of the present invention is defined by the terms of the claims, and is intended to include any modifications within the meaning and scope equivalent to the terms of the claims.

INDUSTRIAL APPLICABILITY

The above embodiment is particularly advantageously applied to a mechanical component made of a titanium alloy and a method for manufacturing the mechanical component made of the titanium alloy.

REFERENCE SIGNS LIST

10 plain bearing, 10a top surface, 10b bottom surface, 10c inner circumferential surface, 10d outer circumferential surface, 10e central axis, S1 preparation step, S2 solution treatment step, S3 aging treatment step, S4 oxygen permeation step, S5 post-treatment step, S21 holding step, S22 cooling step.

The invention claimed is:

1. A mechanical component made of a titanium alloy and having a surface, the mechanical component comprising a plurality of primary α crystal grains and a plurality of secondary α crystal grains,
   at the surface, the primary α crystal grains having an area ratio of 10% or more and 30% or less,
   at the surface, the secondary α crystal grain having a major diameter of 75 μm or less and a minor diameter of 10 μm or less,
   at the surface, the titanium alloy forming a solid solution including 1% by mass or more of oxygen,
   wherein a titanium oxide is removed from the surface so as to expose the solid solution, and
   wherein the solid solution has a hardness of 650 Hv or more at the surface.

2. The mechanical component according to claim 1, wherein the surface includes 1.3% by mass or more of oxygen.

3. The mechanical component according to claim 1, wherein the surface includes 1.6% by mass or more of oxygen.

4. The mechanical component according to claim 3, wherein the solid solution has a hardness of 700 Hv or more.

5. The mechanical component according to claim 1, wherein the titanium alloy is an α-type titanium alloy or an a+β-type titanium alloy.

6. The mechanical component according to claim 5, wherein the titanium alloy is a 64 titanium alloy.

7. The mechanical component according to claim 1, wherein the mechanical component is a bearing component.

8. The mechanical component according to claim 7, wherein the mechanical component is a plain bearing.

9. A method fore manufacturing the mechanical component according to claim 1, comprising: a step of
   preparing a member to be processed, the member being made of a titanium alloy and having a surface;
   a solution treatment step of holding the member at a first holding temperature and subsequently cooling the member;
   an aging treatment step performed after the solution treatment step, and holding the member at a second holding temperature and subsequently cooling the member; and
   an oxygen permeation step performed after the aging treatment step and holding the member in an atmosphere of an oxygen-containing gas at a third holding temperature to introduce the oxygen into the surface,
   the first holding temperature being equal to or higher than a β transformation starting temperature of the titanium alloy and lower than a β single phase transformation temperature of the titanium alloy,
   the third holding temperature being lower than the first holding temperature.

10. The method for manufacturing a mechanical component according to claim 9, wherein the first holding temperature is not lower than a temperature lower by 60° C. than the β single phase transformation temperature of the titanium alloy, and lower than the β single phase transformation temperature of the titanium alloy.

11. The method for manufacturing a mechanical component according to claim 9, wherein in the solution treatment step the member is held for a period of time of 60 seconds or more and 2400 seconds or less.

12. The method for manufacturing a mechanical component according to claim 9, wherein the second holding temperature is 400° C. or higher and 700° C. or lower.

13. The method for manufacturing a mechanical component according to claim 12, wherein the second holding temperature is 500° C. or higher and 560° C. or lower.

14. The method for manufacturing a mechanical component according to claim 12, wherein in the aging treatment step the member is held for a period of time of 30 seconds or more and 4.3×10$^4$ seconds or less.

15. The method for manufacturing a mechanical component according to claim 14, wherein in the aging treatment step the member is held for a period of time of $7.2 \times 10^3$ seconds or more and $3.6 \times 10^4$ seconds or less.

16. The method for manufacturing a mechanical component according to claim 9, wherein the third holding temperature is 800° C. or higher and 920° C. or lower.

17. The method for manufacturing a mechanical component according to claim 16, wherein the third holding temperature is 850° C. or higher.

18. The method for manufacturing a mechanical component according to claim 16, wherein in the oxygen permeation step the member is held for a period of time of $1.4 \times 10^4$ seconds or more and $9.0 \times 10^4$ seconds or less.

19. The method for manufacturing a mechanical component according to claim 9, wherein the gas of the atmosphere has normal atmospheric pressure, the gas of the atmosphere further includes an inert gas, and the gas of the atmosphere has an oxygen partial pressure of 50 ppm or more and 500 ppm or less.

20. The method for manufacturing a mechanical component according to claim 19, wherein the inert gas is at least one selected from the group consisting of argon, helium, and nitrogen.

21. The method for manufacturing a mechanical component according to claim 9, wherein the titanium alloy is an α-type titanium alloy or an α+β-type titanium alloy.

22. The method for manufacturing a mechanical component according to claim 21, wherein the titanium alloy is a 64 titanium alloy.

* * * * *